United States Patent [19]

Nolan, Jr.

[11] 4,201,066
[45] May 6, 1980

[54] FLEXIBLE SHAFT CONSTRUCTION FOR A HIGH INERTIA CENTRIFUGE

[75] Inventor: Thomas E. Nolan, Jr., Medfield, Mass.

[73] Assignee: Damon Corporation, Needham Heights, Mass.

[21] Appl. No.: 891,341

[22] Filed: Mar. 29, 1978

[51] Int. Cl.² ............................. F16C 1/00; F16C 3/00
[52] U.S. Cl. ........................................ 64/1 V; 64/1 R; 233/23 R; 233/23 A
[58] Field of Search ................. 64/1 R, 1 C, 1 V, 2 R; 233/1 C, 23 R, 23 A

[56] References Cited

U.S. PATENT DOCUMENTS

| | | | |
|---|---|---|---|
| 1,872,962 | 8/1932 | Jones | 233/1 C |
| 2,028,730 | 1/1936 | Tholl | 233/1 C |
| 2,220,524 | 11/1940 | Kapitza | 233/1 C |
| 2,404,385 | 7/1946 | Fritts | 64/2 R |
| 2,465,471 | 3/1949 | Packer | 64/1 R |
| 2,827,229 | 3/1958 | Blum | 233/23 |
| 3,049,775 | 8/1962 | Oadeck | 24/126 |
| 3,328,976 | 7/1967 | Shoemaker | 64/1 R |
| 3,443,399 | 5/1969 | Pope | 64/2 R |
| 3,676,723 | 7/1972 | Drucker | 233/23 A |
| 3,682,373 | 8/1972 | Mercier | 233/1 C |
| 3,779,451 | 12/1973 | Lehman | 64/1 V |
| 3,938,354 | 2/1976 | Lehman | 64/1 V |
| 4,061,279 | 12/1977 | Sautter | 64/1 V |

FOREIGN PATENT DOCUMENTS

| | | | |
|---|---|---|---|
| 549718 | 10/1956 | Belgium | 233/1 C |
| 170214 | 6/1906 | Fed. Rep. of Germany | 233/1 C |
| 1001648 | 1/1957 | Fed. Rep. of Germany | 233/23 A |
| 472756 | 6/1952 | Italy | 233/1 C |
| 320300 | 10/1929 | United Kingdom | 64/1 V |
| 876364 | 8/1961 | United Kingdom | 233/1 C |

*Primary Examiner*—Charles J. Myhre
*Assistant Examiner*—R. C. Turner
*Attorney, Agent, or Firm*—Kenway & Jenney

[57] ABSTRACT

A construction for transmitting rotational energy from a motor to a centrifuge rotor utilizes a flexible shaft having a long, thin central portion that terminates in larger diameter end portions or connectors. The lower connector is secured to the motor armature shaft and the upper connector is secured to a rotor adapter that replaceably mounts the rotor. The shaft is structured and positioned to achieve a self-balancing of the rotor for rotational speeds including at least the second critical speed by flexing in its central portion. In a preferred form, a spindle or inner sleeve secures the lower connector to the armature and extends upwardly to a point just below the upper connector. The spindle surrounds the flexible shaft with a first annular clearance sufficient to permit flexure of the shaft for the self-balancing during normal operation. An outer sleeve formed integrally with the rotor adapter surrounds the spindle with a second annular clearance and extends downwardly to a point just above the lower connector. The second annular clearance together with the overlapping lengths of the sleeve and the spindle limit the maximum lateral deflection of the rotor to prevent a permanent deformation of the shaft.

10 Claims, 7 Drawing Figures

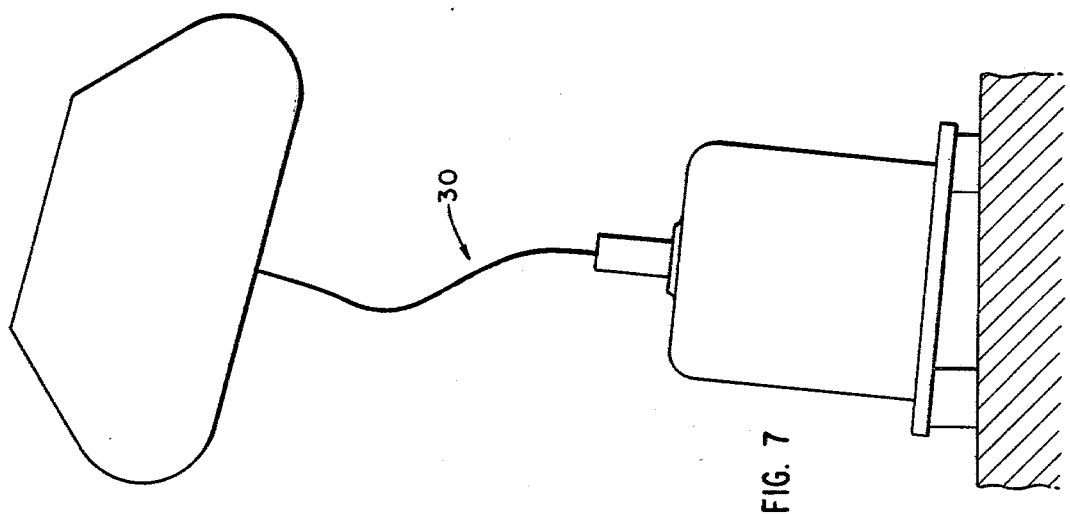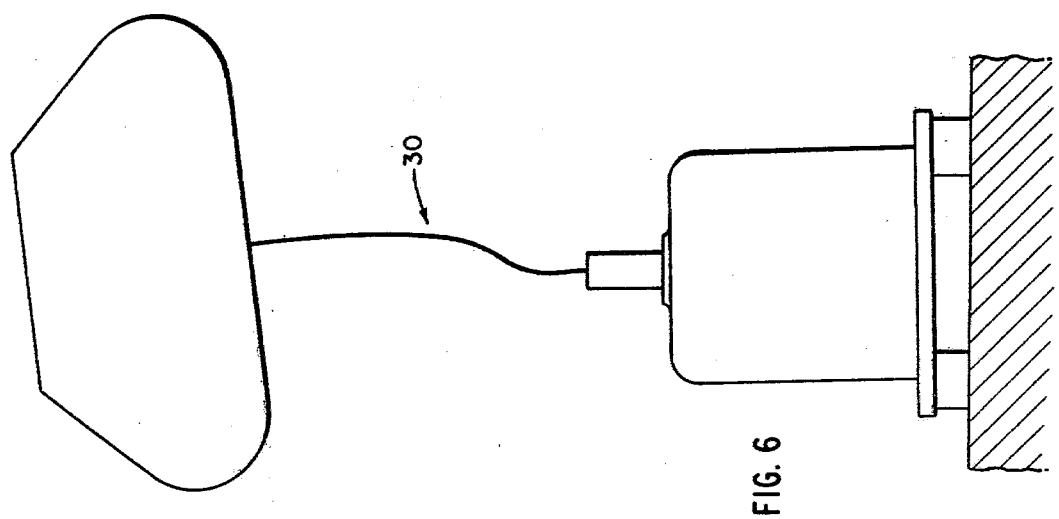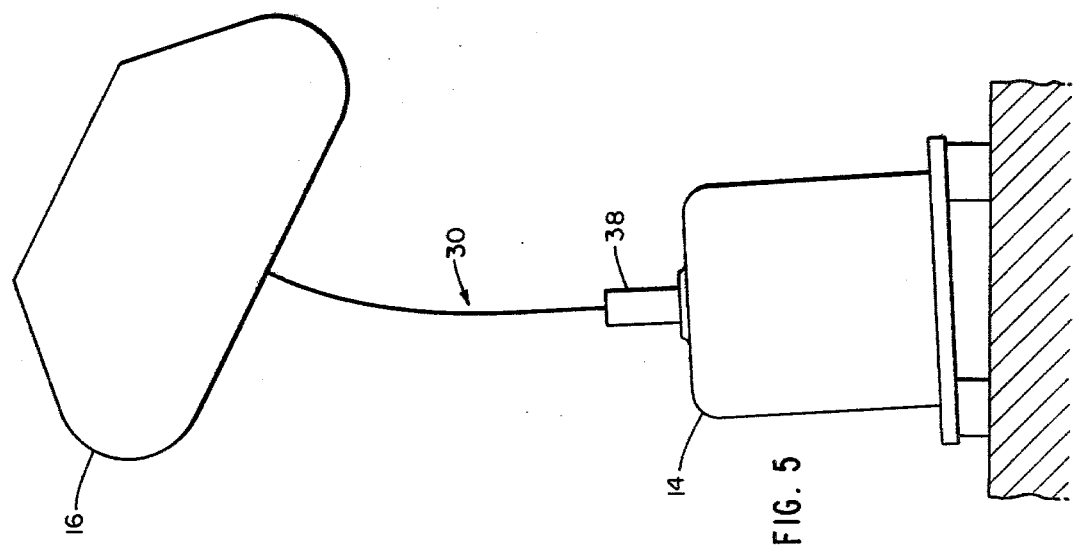

FLEXIBLE SHAFT CONSTRUCTION FOR A HIGH INERTIA CENTRIFUGE

BACKGROUND OF THE INVENTION

This invention relates in general to centrifuges. More specifically it relates to a flexible shaft construction for transmitting rotational energy from a motor to a rotor supported on the upper end of the shaft construction. The present invention is an improvement over U.S. Pat. No. 3,938,354 to Lehman.

In conventional centrifuges a shaft couples a rotor supported on the upper end of the shaft to the armature shaft motor. Containers of liquid samples are carried on the rotor. A problem common to such centrifuges is that speed related vibrations develop in the shaft. In particular, each centrifuge design develops characteristic vibrational modes in the shaft which are associated with so-called critical rotational speeds. In the first mode, the center of mass of rotor deflects laterally from an initial position "geometrically centered" with the vertical axis of rotation of the motor armature and the shaft. The deflection causes the shaft to assume a slight, simple curvature; the center of mass of the rotor follows a circular locus about the vertical axis of rotation. As the rotational speed increases to a second critical speed, the shaft enters a second mode of vibration where the shaft assumes a generally S-shaped curvature. The center of mass of the rotor is again laterally offset from the vertical. At even higher speeds, the shaft vibrates in a third mode having a more complex curvature.

Values for the critical speeds and the amplitude of the vibration depend on factors such as the mass and mass distribution of the rotor and the motor, the height of the rotor and motor centers of mass above a motor mount, and the spring characteristics of the mount. The design of the connecting shaft is nevertheless a key factor affecting the performance of a given centrifuge. For example, relatively stiff or thick, short shafts vibrate more severely than relatively long, thin shafts. Such long, thin shafts flex more readily to accommodate vibrations and thereby provide a "smooth ride" for the samples in the rotor. Long, thin shafts are therefore usually employed in centrifuge applications where vibration must be minimized such as the separation of blood.

It is also important to control a "downward" transmission of vibrational energy from the typically heavy, rapidly rotating rotor which can place a severe load on the motor bearings, cause the centrifuge to "walk" along a floor or bench top, or generate a high noise level. A well-known technique to control these problems is to mount the motor on elastomeric members such as rubber springs. Elastomeric mounts cannot, however, control vibrations generated by a high inertia centrifuge if the shaft is not properly constructed and positioned with respect to the motor and the rotor.

While the vibrational advantages of a long, thin, flexible shaft are well known, they are easily damaged by the mechanical stress of loading or replacing the centrifuge rotor. Also, a severe imbalance during operation can permanently deform or shear the shaft. U.S. Pat. No. 2,827,229 describes one arrangement for protecting the shaft against damage. The shaft is encased with a flexible material that turns on ball bearings held in a flexible race attached to a stationary housing. This arrangement does support the shaft, but it is very expensive to manufacture because a large number of parts must be assembled with a high degree of precision. Also, because the bearings confine the shaft the support structure increases the vibrations, particularly at a critical speed. Another solution, to provide a dampening arrangement, results in an unsatisfactory level of vibration in the rotor.

U.S. Pat. Nos. 3,779,451 and the other aforementioned 3,938,354 both to Lehman and commonly assigned with this application, describe more successful solutions. The '451 patent discloses a shaft surrounded by a rubber sleeve that is in turn enclosed in a rigid tubular member. This construction exhibits low vibrational levels, but is not completely satisfactory in preventing a permanent deformation of the shaft.

The '354 patent also uses a rigid tubular member, but it surrounds the shaft with a clearance that allows the shaft to flex freely. The upper end of the shaft is held in a rotor adapter that has a relatively short, downwardly projecting sleeve that extends into the tubular member. A clearance between the rotor adapter sleeve and the tubular member limits lateral movement of the upper end of the shaft to prevent its permanent deformation. While this construction has proven commercially viable, it is limited in application to relatively moderate rotational speeds. Specifically, at speeds at or above the second critical speed where the shaft is in the S-shaped second mode, it has a tendency to shear, particularly when the centrifuge is also accelerating or decelerating sharply. Since for many conventional centrifuges the second critical speed is typically near 1,000 rpm, and it is frequently desirable to operate even relatively small bench top centrifuges at speeds up to 6,000 rpm the Lehman '354 design severely limits the usefulness or reliability of the centrifuge.

It is therefore a principal object of this invention to provide a flexible shaft construction for a high inertia centrifuge that controls vibrations, protects the shaft against permanent deformation due to a mechanical stress on the rotor, and operates without damage to the shaft at speeds at or above the second or third critical speeds.

Another object is to provide a shaft construction that protects the shaft against permanent deformation or shearing during operation due to a severe imbalance.

A further object is to provide a shaft construction that provides a highly smooth ride, does not cause the centrifuge to "walk" and has a low noise level.

Yet another object is to provide a shaft construction that provides high acceleration and deceleration rates that substantially reduce the time required for a centrifuge operation.

A still further object is to provide a shaft construction that accepts a variety of rotors and minimizes the likelihood of damage to the motor due to a severe imbalance condition.

Another object is to provide a shaft construction that has a comparatively long life and a comparatively low cost of manufacture.

SUMMARY OF THE INVENTION

A centrifuge uses a flexible shaft construction to transmit rotational energy from a motor to a rotor supported on the upper end of the construction. The construction includes a flexible shaft with a generally long, thin central portion and end connector portions having slightly larger diameters. In a preferred form, a tubular spindle surrounds and is spaced uniformly from the central portion of the shaft to define a first annular clearance. A lower portion of the spindle secures the lower shaft connector to the armature shaft of the motor. An upper portion of substantially uniform cross sectional dimensions extends upwardly to a free end located just below the lower connector.

The construction also includes a rotor adapter secured on the upper connector of the shaft. The rotor adapter replaceably mounts the rotor on a conical surface and a threaded projection at the upper end of the conical surface. The conical surface is preferably coated with an extremely hard, non-adhering coating. A tubular sleeve, also a component of the shaft construction, is formed integrally with the rotor adapter. The adapter sleeve surrounds the spindle to define a second annular clearance and extends downwardly to a free end located just above the lower connector. The spindle and adapter sleeve thus substantially overlap one another and, when the shaft is undeflected, are concentric with each other, the shaft, and the vertical axis of rotation of the centrifuge.

The dimensions of the shaft, particularly the length and diameter of its flexible central portion and its position with respect to the motor and the rotor, are selected so that the shaft flexes over this flexible region to self-balance the rotor over a range of operating speeds that includes at least the first three primary critical speeds. In a preferred form for a centrifuge useful in blood separation, the flexible shaft portion has a total length of five and three-quarters inches, a diameter of one-quarter inch, and is formed of stainless steel with a modulus of elasticity of 28,500,000 pounds per square inch (psi). In this form, the spindle preferably has an inner diameter of 0.40 inch and an outer diameter of 0.60 inch and the adapter sleeve has an inner diameter of 0.70 inch. These annular clearances and the substantial vertical overlap of the spindle and the sleeve allow the shaft to flex in the first three primary critical modes without restriction to achieve the self-balance while at the same time restricting the lateral deflection of the shaft to prevent permanent deformation of the shaft. More generally, a flexible shaft construction of this invention utilizes a shaft whose dimensions and location are matched with the particular centrifuge system to ensure that the self-balancing flexure of the shaft and related stress concentrations are located in the flexible central portion.

These and other features and objects of this invention will be more fully understood from the following detailed description of the preferred embodiments which should be read in light of the accompanying drawings.

BRIEF DESCRIPTION OF THE DRAWINGS

FIGS. 5-7 are simplified views corresponding to FIG. 1 showing the shape of the flexible shaft in the first, second and third primary critical modes, respectively.

DETAILED DESCRIPTION OF THE PREFERRED EMBODIMENTS

Figure 1:
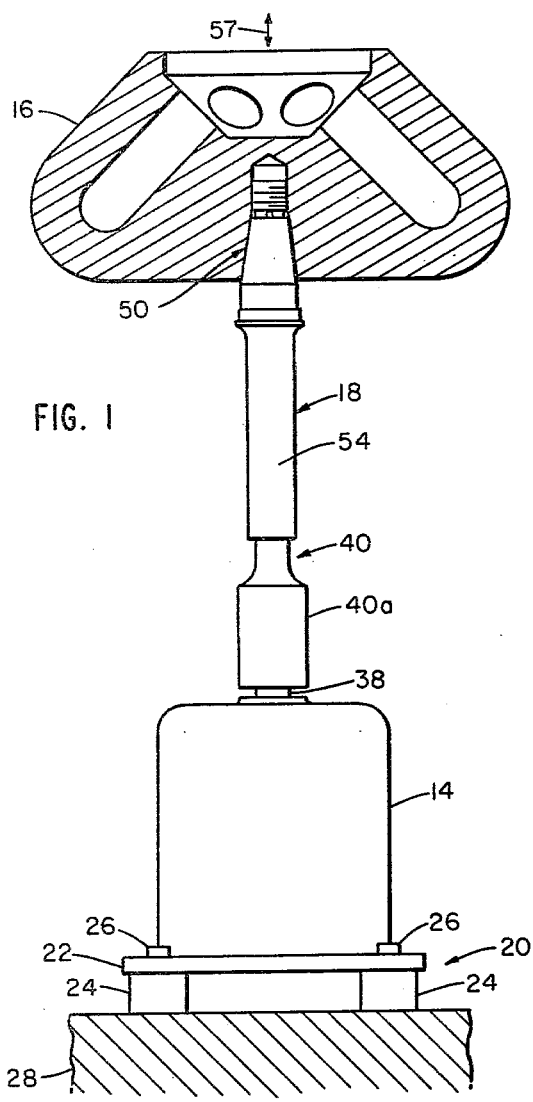
FIG. 1 is a view in side elevation and partially in section of a centrifuge utilizing a flexible shaft construction according to this invention.
Figure 2:
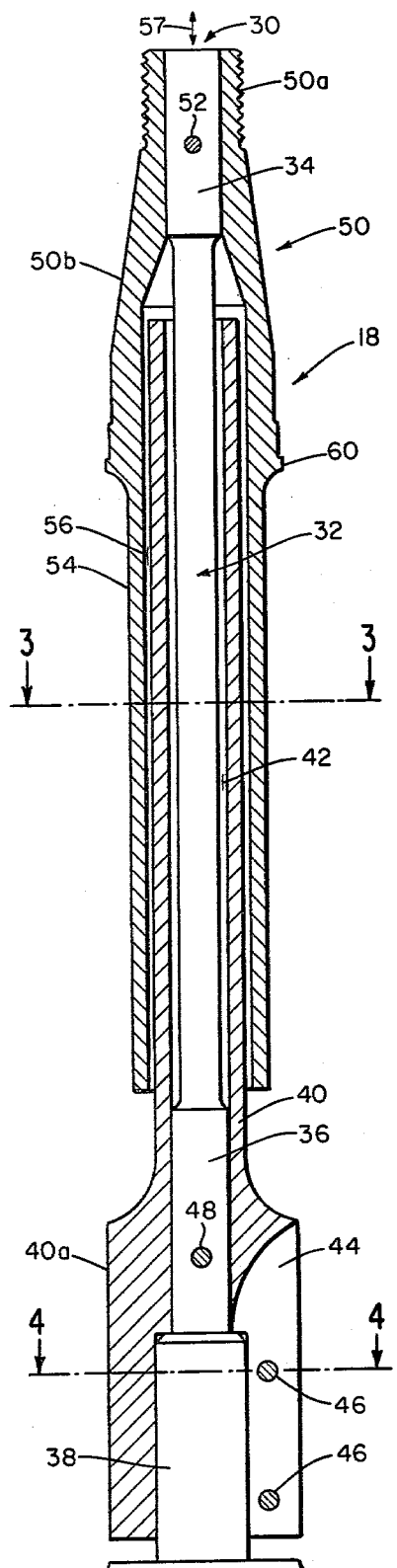
FIG. 2 is an enlarged view in vertical section of the shaft construction shown in FIG. 1.
Figure 3:
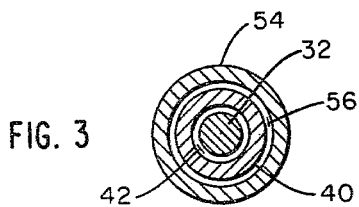
FIGS. 3 and 4 are views in horizontal section taken along the lines 3—3 and 4—4, respectively of FIG. 2.

FIG. 1 shows a centrifuge 12 that includes a motor 14, a rotor 16 and a flexible shaft construction 18 that transmits rotational energy from the motor to the rotor. This invention will be described with reference to a centrifuge 12 that is a floor type, high inertia centrifuge useful in the separation of blood. It has a maximum operating speed of 6,000 rpm and a typical operating speed of 4,200 rpm with a twenty-one inch diameter, high inertia rotor. The principles of this invention as embodied in the shaft construction 18 are, nevertheless, not restricted to any particular type of centrifuge or operating speed. It will be understood that the advantages of this invention are best suited for applications commonly characterized as "high inertia" and where the operating speeds are sufficiently high that the shaft construction operates in its second or third mode critical condition.

The motor 14 is secured to a conventional mount 20 that has a steel base plate 22 supported on three elastomeric members 24 such as rubber springs. Bolts 26 that each penetrate the base 22 and one of the members 24 secure the mount 20 to a fixed base 28. The elastomeric members offer a resilient spring force with both vertical and horizontal components to absorb vibrational energy generated by the centrifuge.

With reference to FIGS. 1-4, the flexible shaft construction 18 includes a flexible shaft 30 that has a generally long, thin configuration and a circular cross section. The shaft has a central portion 32 of a uniform diameter and upper and lower end portions or connectors 34 and 36, respectively, of a slightly larger diameter. The lower connector 36 abuts and is centered on an armature shaft 38 of the motor 14. The diameter of the connector is smaller than that of the armature shaft.

Figure 4:
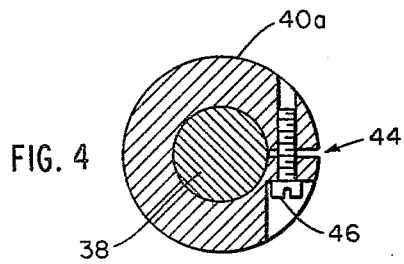

An inner sleeve or spindle 40 surrounds the shaft portion 32 with a clearance 42. The spindle extends vertically upwards to a free end just below the upper connector 34. A lower clamp portion 40a of the spindle firmly engages the armature shaft 38. The portion 40a holds the connector 36 with a light interference fit. A longitudinal slot 44 in the portion 40a is spanned by a pair of screws 46, 46 to secure the shaft connector 36 to the armature 38. As is best seen in FIG. 4, the screw threads in one side of the slot 44 and passes freely through a hole and counterbore in the opposite side. The connector 36 is also secured to the spindle portion 40a by a pin 48.

The upper connector 34 is similarly secured in a rotor adapter 50 by a light interference fit and a pin 52. The upper end of the connector 34 is flush with the end face of a threaded portion 50a of the adapter. Immediately below the threaded portion 50a is a conical surface 50b. The rotor 16 has a mating conical surface and threads to receive the portion 50a. To prevent the rotor from jamming on the rotor adapter, the conical surface is preferably coated with an electroless nickel preparation with Teflon such as the product sold under the trade designation Poly-On by Poly Metals, Inc. of Springfield, Mass.

The rotor adapter has a downwardly projecting outer sleeve 54 that is concentric with the shaft 30 and the spindle 40 and surrounds the spindle with a clearance 56. The sleeve 54 extends vertically downward to a free end just above the lower connector 36. In their undeflected condition, the shaft 18, spindle 40 and sleeve 54 are concentric and coaxial with each other and a vertical axis of rotation 57. When the centrifuge is not operating, or operating at a speed below the first critical speed, the armature shaft 38 and the centers of mass of the motor 14 and the rotor 16 also lie on the axis 57.

A principal feature of this invention is that the sleeve and spindle substantially overlap one another vertically and in combination with the relatively small clearances 42 and 56 limit the maximum lateral deflection of the rotor, rotor adapter and the upper portion of the shaft from the vertical central axis of rotation 57. More specifically, they limit the maximum lateral deflection to a value at which the shaft 30 will not become permanently deformed or otherwise damaged. As a result, mechanical stresses associated with loading the rotor, changing the rotor, or a severe imbalance during operation (e.g. when one sample container is missing) will not destroy the relatively delicate shaft 30.

The shaft 30 is preferably formed of stainless steel, and in particular a 17-4 PH alloy having a modulus of elasticity of 28,500,000 psi. The spindle 40 and rotor adapter 50, including its sleeve 54 are preferably also formed of stainless steel. The shaft 30 is preferably heat treated at 1150° F. for four hours and air cooled to toughen the shaft without excessive hardening. The stainless parts are passivated to remove all scale and foreign particles by immersing them for twenty to thirty minutes in a solution of warm 20% volume nitric acid and 22 gm/liter of sodium dichromate.

The shaft 30, and particularly the central portion 32 is sufficiently thick to withstand the large torsional forces applied to it. The thickness also provides sufficient stiffness to counterbalance the unbalance forces relative to the vertical axis of rotation 57, as discussed in greater detail below. The length of the shaft 30, and particularly the central portion 32, is significant in relation to the diameter to yield a shaft that is properly proportioned to function in a manner also described below.

FIGS. 5–7 illustrate the performance of the flexible shaft construction 18 during operation of the centrifuge 12. In each of these drawings the flexible shaft 30 is represented by a single line which represents its axial centerline. The shaft curvature as shown is highly exaggerated since the lateral shaft movement is typically on the order of several hundreths of an inch. Before the centrifuge is operated, the rotor, shaft and motor armature shaft are vertically aligned with the axis 57 and the spindle 40 and the adapter sleeve 56 are concentric with the shaft 30 along its length. Loading the rotor, or replacing it, can permanently bend the shaft 30, but the overlapping sleeve and spindle limit the flexure to a degree that does not permanently deform the shaft. As rotation begins, the rotor, shaft and armature shaft rotate about their common vertical axis 57. When the rotational speed reaches the first critical speed, the shaft enters a first critical mode as shown in FIG. 5. The rotor is tilted from the horizontal and its center of mass follows a circular path about the axis 57. The motor also tilts very slightly on its mount 20, and its armature has a polar moment of inertia. The flexure of the shaft 30 develops a spring force which counterbalances the rotor. Also in the first mode, the motor and motor armature deflect laterally in phase with the lateral deflection of the rotor, although usually at a much smaller amplitude.

A significant feature of the shaft 30 is that it is structured to flex in a manner that automatically self-balances the centrifuge components. The shaft 30 is proportioned so that the flexure, and its associated strain, occur in the flexible portion of the shaft, that is, the region of the central portion 32 not near the connectors 34, 36. As shown in FIG. 5, the lower portion of the shaft portion 32 is generally coincident with the centerline 58, but its upper portion is inclined toward the tilted rotor.

As the rotational speed increases further, a second critical speed is reached where the shaft 30 assumes a second mode critical configuration as shown in FIG. 6. This mode is characterized by the shaft assuming an S-shape. In this mode, the tilts of the rotor and motor from the horizontal are out of phase. The amplitude of the rotor tilt is less than that of the motor and substantially less than the rotor tilt in the first mode. As in the first mode, the shaft 30 is structured to achieve a self-balancing with the flexure and the associated strain occurring in the flexible portion of the shaft, the region of the central portion 32 spaced from the connectors 34, 36. These important characteristics also hold as the speed is increased further until a third critical speed is reached and the shaft 30 assumes a third mode critical configuration, a compound S-shape as shown in FIG. 7.

The self-balancing of the shaft and the rubber springs 24 together absorb most of the vibration energy produced by the rotation. This results in a smooth ride for the samples both at the selected operating speed and during acceleration and deceleration. As a result, separation of the sample is achieved quickly and maintained as the centrifuge brakes. Another significant advantage of this invention is that because the flexure of the shaft occurs in its most flexible region, the shaft will not shear at significantly higher acceleration and deceleration rates than previously practical. Maximum operating speed is typically achieved in about one-half the shortest time previously thought to be safe. The control of vibration in the shaft and mount also reduces noise and the tendency of the centrifuge to "walk".

The deflection control provided by the spindle and sleeve are also important during operation. If there is a severe imbalance, due for example to a missing sample container, the spindle and sleeve prevent the imbalance from bending the shaft to a point where it will permanently deform and possibly destroy the motor as well. This limitation is important even though the centrifuge has an imbalance sensing device that automatically applies a brake since the imbalance may be sufficiently sudden or severe to damage the shaft or the motor before the brake acts. Another feature of this invention is that the lower connector 36 is substantially thinner than the armature shaft 38. Because of this difference, a severe imbalance which cannot be controlled will damage the shaft 30, but is impact will not be transmitted to the motor.

By way of illustration, the centrifuge 12 is a high inertia floor type designed for operation at speeds up to 6,000 rpm with a variety of interchangeable rotors. The following detailed data will be with reference to a twenty-one inch diameter rotor that holds six one liter samples and specifically a rotor sold by Damon/IEC under the trade designation type 981. The shaft 30 has an overall length of 8.60 inches. The connectors 34 and 36 extend for 1.25 and 1.50 inches, respectively, and each has a basic diameter of 0.3750 inch. The central portion 32 of the shaft has a length of 5.75 inches and a diameter of 0.25 inch. The connectors join the flexible shaft portion in a curved shoulder with a radius of curvature of approximately 0.38 inch. The lower end of the flexible portion is located 13.25 inches above the motor mount 20 and the center of mass of the rotor is nineteen inches above the motor mount. The spindle 40 has total length of 8.18 inches; the lower portion 40a has a length of 2.88 inches to the top of the connector 36. Its inner diameter is 0.3750 inch adjacent the connector 36 and approximately 0.40 inch above the connector. The outer diameter adjacent the shaft central portion 32 is 0.60 inch. When centered, the first clearance 42 is annular and has a uniform width of 0.05 inch.

The rotor adapter has an overall length of 7.00 inches with the threaded portion 50a extending 0.7 inch, the conical surface 50b extending 1.19 inch and the sleeve 52 extending 4.25 inches from its lower edge to a flange 60. The upper connector 34 rests in a bore with an inner diameter of 0.375 inches which extends from the upper end of the threaded portion 50a for 1.25 inches. The sleeve 52 has an inner diameter of 0.700 inch and an outer diameter of 0.900 inch. The inner diameter is uniform for 5.31 inches from the lower end of the sleeve. When centered, the clearance 56 is annular and has a uniform width of 0.05 inch.

The rotor has a mass of forty-two pounds (approximately 19 kg), a horizontal moment of inertia of 923 lb/in$^2$ and a polar moment of inertia of 1845 lb/in$^2$. Its center of mass is 19 inches above the motor mount. The motor has a mass of 46.5 pounds, a center of mass height of six inches, a horizontal moment of inertia of 435.8 lb/in$^2$ and its armature has a polar moment of inertial of 8.5 lb/in$^2$. The mount has three elastomeric members 24 spaced equidistantly on a seven inch diameter circle. The vertical compressive spring constant of the mount is 2,000 lb/in and the lateral spring constant is 500 lb/in.

With the foregoing values, the centrifuge has a first critical speed at 227 rpm, a second critical speed at 1134 rpm, and a third critical speed at 3274 rpm. The center of the rotor tilt in these modes is 11.18, 8.081 and 8.470 inches, respectively, below its center of mass. In the first and second modes the motor center of tilt is 7.638 and 24.102 inches, respectively, below the motor center of mass. In the third mode, the center of tilt is 0.442 inch above the motor's center of mass. In the first mode, the ratio of the rotor displacement to the motor displacement is 4.1 to 1. In the second mode the ratio is 1 to 2.6; in the third mode the ratio is 1 to 1.6.

While the invention has been described with reference to its preferred embodiments, it will be understood that modifications and variations will occur to those skilled in the art from the foregoing detailed description and the accompanying drawings. In particular, while the invention has been described with the upwardly extending spindle lying within the downwardly extending adapter sleeve, the position of these parts can be reversed (the adapter sleeve surrounded by the spindle) provided the clearances and the vertical extent of their overlap are substantially the same. Also, while the flexible shaft 30 can accommodate rotors with varying masses and mass distribution (horizontal and polar moments of inertia), it is also within the scope of this invention to structure the flexible shaft for a wide variety of centrifuge designs and applications utilizing the broad features described above, particularly the arrangement for limiting the lateral deflection of the shaft and the proportioning of the shaft to produce the self-balancing flexure of the shaft in its flexible portion for all critical modes encountered during operation. Such modifications and variations are intended to fall within the scope of the appended claims.

What is claimed and desired to be secured by Letters Patent is:

1. In a centrifuge that includes a motor secured on an elastomeric mount, a rotor vertically spaced above the motor, and a flexible shaft connected at its upper end to a rotor adapter that replaceably supports the rotor and at its lower end to the motor to transmit rotational energy from the motor to the rotor, the shaft having a relatively long, thin flexible portion intermediate said connections, wherein the improvement comprises a shaft construction comprising,
   a first tubular member connected to and extending vertically from the motor toward the rotor,
   a second tubular member connected to and extending vertically from said rotor adapter toward said motor,
   said first and second tubular members each surrounding said shaft and defining first and second annular clearances between said shaft and one another,
   said first and second tubular members each being substantially vertically coextensive with said shaft, and
   said shaft being structured and vertically positioned with respect to said motor and said rotor to produce self-balancing of said rotor through a flexure in said flexible portion of said shaft during rotation at the first and at least the second critical speeds,
   the lengths of said first and second tubular members and the dimensions of said first and second clearances being selected to limit the lateral deflection of said shaft due to a deformation at any point along its length so that said shaft is not permanently deformed, said deformation including deformation characteristic of the first and at least the second critical speeds.

2. A centrifuge shaft construction according to claim 1 wherein the one of said first and second clearances adjacent said shaft is sufficient to accommodate the flexure of said shaft during said self-balancing.

3. A centrifuge shaft construction according to claim 1 wherein said rotor rotates with a lateral deflection from a vertical axis of rotation, and wherein the dimensions and elastic modules of said shaft develop a spring force that balances a polar moment of inertia of said deflected rotor.

4. A centrifuge shaft construction according to claim 1 wherein said motor has an armature shaft that is aligned with said shaft and said first tubular member secures said armature shaft to said shaft.

5. A centrifuge shaft construction according to claim 1 wherein said first and second tubular members each extend to a free end located just before one of said connections.

6. A centrifuge shaft construction according to 4 wherein said lower connection has a diameter that is substantially smaller than the diameter of said armature shaft.

7. A centrifuge shaft construction according to claim 1 wherein the flexible portions of said shaft extend vertically for approximately 5.75 inches and has a diameter of 0.25 inch.

8. A centrifuge shaft construction according to claim 1 wherein said first and second annular clearances each have a width of approximately 0.05 inch and said first and second tubular members vertically overlap one another for approximately five inches.

9. A centrifuge shaft construction according to claim 1 wherein said rotor adapter has a conical surface that supports said rotor, said conical surface having a coating of a hard material that resists jamming.

10. A centrifuge shaft construction according to claim 9 wherein said material is an electroless nickel preparation with Teflon.

* * * * *